(12) United States Patent
Tachiiwa (10) Patent No.: US 11,341,862 B2
(45) Date of Patent: May 24, 2022

(54) FLIGHT MANAGEMENT DEVICE AND FLYING DEVICE

(71) Applicant: KDDI CORPORATION, Tokyo (JP)

(72) Inventor: Masayuki Tachiiwa, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 16/976,187

(22) PCT Filed: Feb. 13, 2019

(86) PCT No.: PCT/JP2019/005077
§ 371 (c)(1),
(2) Date: Aug. 27, 2020

(87) PCT Pub. No.: WO2019/176423
PCT Pub. Date: Sep. 19, 2019

(65) Prior Publication Data
US 2020/0410878 A1    Dec. 31, 2020

(30) Foreign Application Priority Data
Mar. 13, 2018  (JP) .............................. JP2018-045743

(51) Int. Cl.
*G08G 5/04* (2006.01)
*B64C 39/02* (2006.01)
(Continued)

(52) U.S. Cl.
CPC .............. *G08G 5/045* (2013.01); *B64C 39/02* (2013.01); *G08G 1/162* (2013.01); *G08G 5/0021* (2013.01)

(58) Field of Classification Search
CPC . B64C 2201/042; B64C 39/02; B64C 39/024; B64D 25/00; B64D 27/24;
(Continued)

(56) References Cited

U.S. PATENT DOCUMENTS

2017/0355469 A1*  12/2017  Canning ................ B64D 47/06
2018/0302769 A1   10/2018  Kimura
2019/0104496 A1*  4/2019   Sogo .................... G05D 1/0022

FOREIGN PATENT DOCUMENTS

JP    2016-210302 A    12/2016
JP    2017-210156 A    11/2017
(Continued)

OTHER PUBLICATIONS

International Search Report issued in corresponding application No. PCT/JP2019/005077 dated Apr. 16, 2019 with English translation.
(Continued)

*Primary Examiner* — Sisay Yacob
(74) *Attorney, Agent, or Firm* — Foley & Lardner LLP (57) ABSTRACT

A flight management device for managing a flying device which includes an identification unit configured to identify that the flying device is likely to fall and a communication unit configured to transmit the notification information representing that the flying device is likely to fall to the flight management device together with the position information representing a position in flight when the flying device is likely to fall. a notification unit configured to transmit warning information to a vehicle at a position corresponding to position information when notification information has been received from the flying device in flight.

14 Claims, 5 Drawing Sheets

(51) Int. Cl.
*G08G 1/16* (2006.01)
*G08G 5/00* (2006.01)

(58) Field of Classification Search
CPC ........ B64D 47/02; G08B 31/00; G08G 1/162; G08G 5/0021; G08G 5/04; G08G 5/045; G08G 7/02
See application file for complete search history.

(56) References Cited

FOREIGN PATENT DOCUMENTS

| | | |
|---|---|---|
| JP | 6288901 B | 3/2018 |
| WO | WO-2017/006421 A1 | 1/2017 |
| WO | WO-2017/033976 A1 | 3/2017 |
| WO | WO-2017/068832 A1 | 4/2017 |
| WO | WO-2017/081898 A1 | 5/2017 |
| WO | WO-2017/221560 A1 | 12/2017 |
| WO | WO-2018/043284 A1 | 3/2018 |

OTHER PUBLICATIONS

Office Action issued in corresponding Japanese Patent Application No. 2018-045743 dated Mar. 2, 2021, with English translation.
Office Action issued in corresponding Japanese Application No. 2018-045743 dated Dec. 8, 2020, with English translation.

\* cited by examiner

FLIGHT MANAGEMENT DEVICE AND FLYING DEVICE

TECHNICAL FIELD

The present invention relates to a flight management device for managing a flying device and a flying device.

Priority is claimed on Japanese Patent Application No. 2018-45743, filed Mar. 13, 2018, the content of which is incorporated herein by reference.

BACKGROUND ART

Conventionally, it is known that there is a technology for reducing a probability that a flying device will fall in a fall avoidance area by performing control for increasing a flight speed of the flying device when the flying device is approaching the fall avoidance area (for example, see Patent Document 1).

PRIOR ART DOCUMENTS

Patent Document

[Patent Document 1]
Japanese Unexamined Patent Application, First Publication No. 2017-210156

SUMMARY OF INVENTION

Problems to be Solved by the Invention

Even if it is possible to reduce a probability that a flying device will fall using the conventional technology, this does not mean that the flying device will not fall. If the flying device falls while flying above a road, a collision with a vehicle, which is traveling on the road, may occur.

Therefore, the present invention has been made in view of these points and an object of the present invention is to reduce a probability that a flying device will fall on a vehicle.

Means for Solving the Problems

According to a first aspect of the present invention, a flight management device for managing a flying device is provided. The flying device includes an identification unit configured to identify that the flying device is likely to fall and a communication unit configured to transmit notification information representing that the flying device is likely to fall to the flight management device together with position information representing a position in flight when the flying device is likely to fall. The flight management device includes a notification unit configured to transmit warning information to a vehicle at a position corresponding to the position information when the notification information has been received from the flying device in flight.

For example, the identification unit may identify that the flying device is likely to fall on the basis of the remaining amount of power of a battery that provides electric power for causing the flying device to be driven. The identification unit may identify that the flying device is likely to fall on the basis of a wind speed and a wind direction.

The flight management device may further include a flight management device estimation unit configured to estimate a caution area where the flying device is likely to fall on the basis of a flight speed and a flight direction of the flying device, wherein the notification unit may transmit the warning information to the vehicle within the caution area estimated by the flight management device estimation unit.

The flying device may further include a flying device estimation unit configured to estimate a caution area where the flying device is likely to fall on the basis of a flight speed and a flight direction of the flying device, the communication unit may transmit notification information including area information representing the caution area to the flight management device, and the notification unit may transmit the warning information to the vehicle within the caution area represented by the area information.

The notification unit may transmit the warning information to an authority that manages a road on which the flying device is likely to fall. The notification unit may transmit the warning information to the vehicle via a base station of a portable phone network in which radio waves are likely to reach the flying device. The notification unit may transmit the warning information continuously after the flying device falls. The vehicle may have an automated traveling function of receiving the warning information from the notification unit and changing a route.

According to a second aspect of the present invention, a flying device is provided. The flying device includes: an identification unit configured to identify that the flying device is likely to fall while the flying device is in flight; and an output unit configured to output warning information to a vehicle on a road while the flying device is in flight when the flying device is likely to fall.

For example, the identification unit may identify that the flying device is likely to fall on the basis of the remaining amount of power of a battery that provides electric power for causing the flying device to be driven. The identification unit may identify that the flying device is likely to fall on the basis of a wind speed and a wind direction.

The flying device may further include an estimation unit configured to estimate a caution area where the flying device is likely to fall, wherein the output unit may output the warning information to the vehicle within the caution area.

The output unit may radiate light to the vehicle within the caution area as the warning information. The output unit may output a signal of a magnitude according to a level of a probability that the flying device will fall as the warning information.

Advantageous Effects of the Invention

According to the present invention, there is an advantageous effect in that it is possible to reduce a probability that a flying device will fall on a vehicle.

EMBODIMENTS FOR CARRYING OUT THE INVENTION

[Outline of Flight Management System S]

Figure 1:
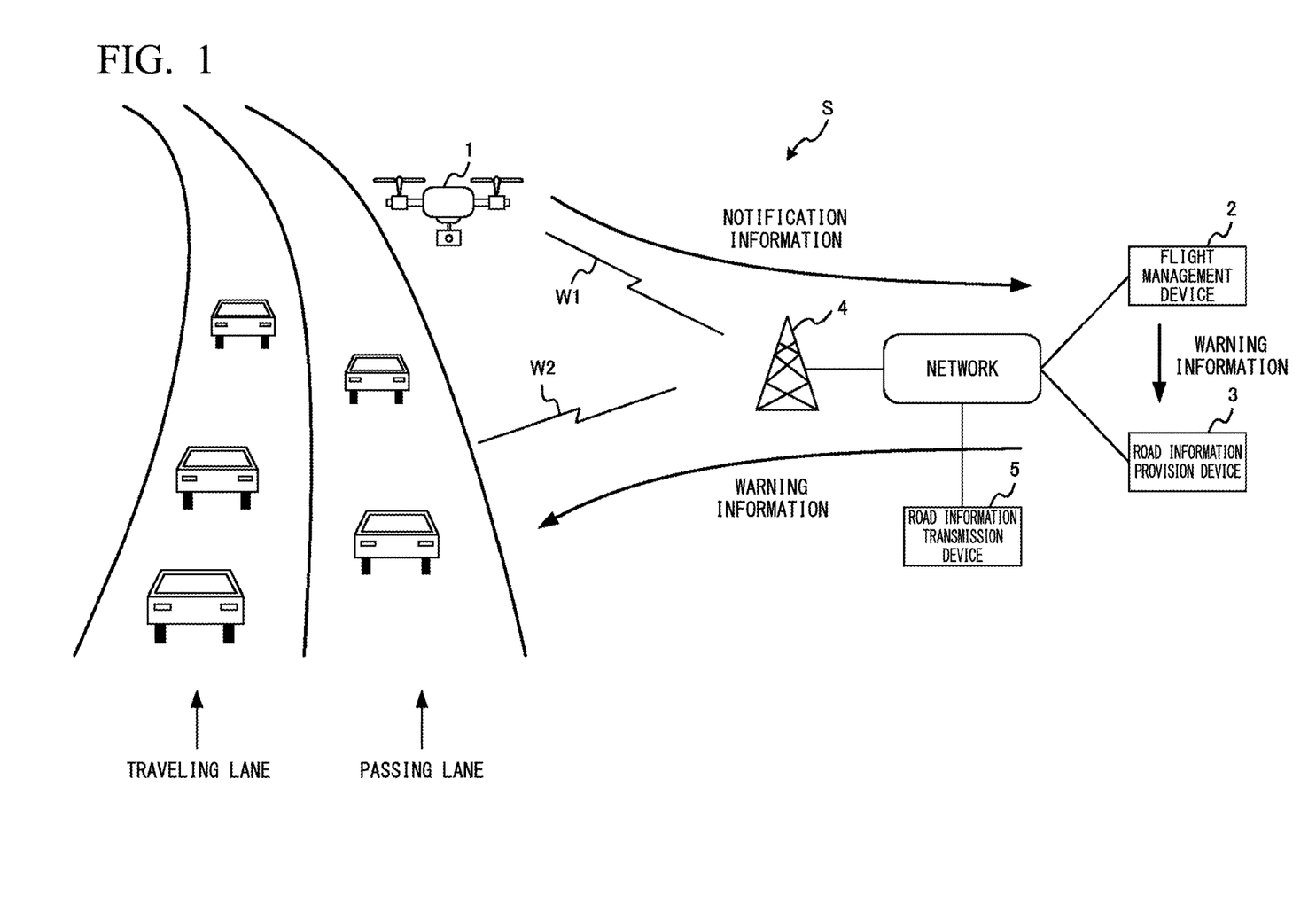
FIG. 1 is a diagram for describing an outline of a flight management system including a flight management device and a flying device according to an embodiment.

FIG. 1 is a diagram for describing an outline of a flight management system S. The flight management system S is a system for warning a vehicle that is located in an area where a flying device 1 is likely to fall and is traveling or stopped on a road when the flying device 1 is likely to fall. The flying device 1 is, for example, a drone that can fly in an unmanned mode.

The flight management system S includes a flying device 1 and a flight management device 2. The flight management device 2 is a server for managing a flight direction, a flight speed, and the like of the flying device 1. The flight management device 2 is used by a service provider that manages a flight of the flying device 1. A road information provision device 3 is a server used by a service provider that manages roads. The road information provision device 3 transmits various types of information to vehicles via a road information transmission device 5 installed on the road.

The flying device 1 periodically transmits position information representing a flight position to the flight management device 2, for example, via a base station 4 of a portable phone network. The flying device 1 monitors a level of a probability of its own falling. When it is determined that the probability of falling is greater than or equal to a predetermined value, the flying device 1 transmits notification information representing that there is a possibility of falling to the flight management device 2.

The flight management device 2 notifies the vehicle of warning information via the road information provision device 3 when it is identified that the flying device 1 is likely to fall. For example, when the flight management device 2 receives the notification information from the flying device 1, the flight management device 2 transmits warning information representing that the flying device 1 is likely to fall to the road information provision device 3. For example, the flight management device 2 notifies the road information provision device 3 of the warning information including a position where the flying device 1 is likely to fall and a level of a probability that the flying device 1 will fall at each position.

When the warning information is received from the flight management device 2, the road information provision device 3 provides a notification of the warning information to the vehicle which is traveling at a position where the flying device 1 is likely to fall. In the vehicle that has received the notification of the warning information, a driver is warned by outputting a sound including the warning information or displaying the warning information on a car navigation device. When the vehicle has an automated driving function, the vehicle that has received the warning information changes a route so that the vehicle moves away from a position where a probability that the flying device 1 will fall is high in conjunction with another automated driving vehicle.

In this manner, the flight management system S provides a notification of the warning information to the vehicle which is traveling in an area where the flying device 1 is likely to fall. Therefore, when the flying device 1 falls, it is possible to prevent the flying device 1 from colliding with the vehicle.

Hereinafter, configurations of the flying device 1 and the flight management device 2 will be described in detail.

[Configuration of Flying Device 1 According to First Embodiment]

Figure 2:
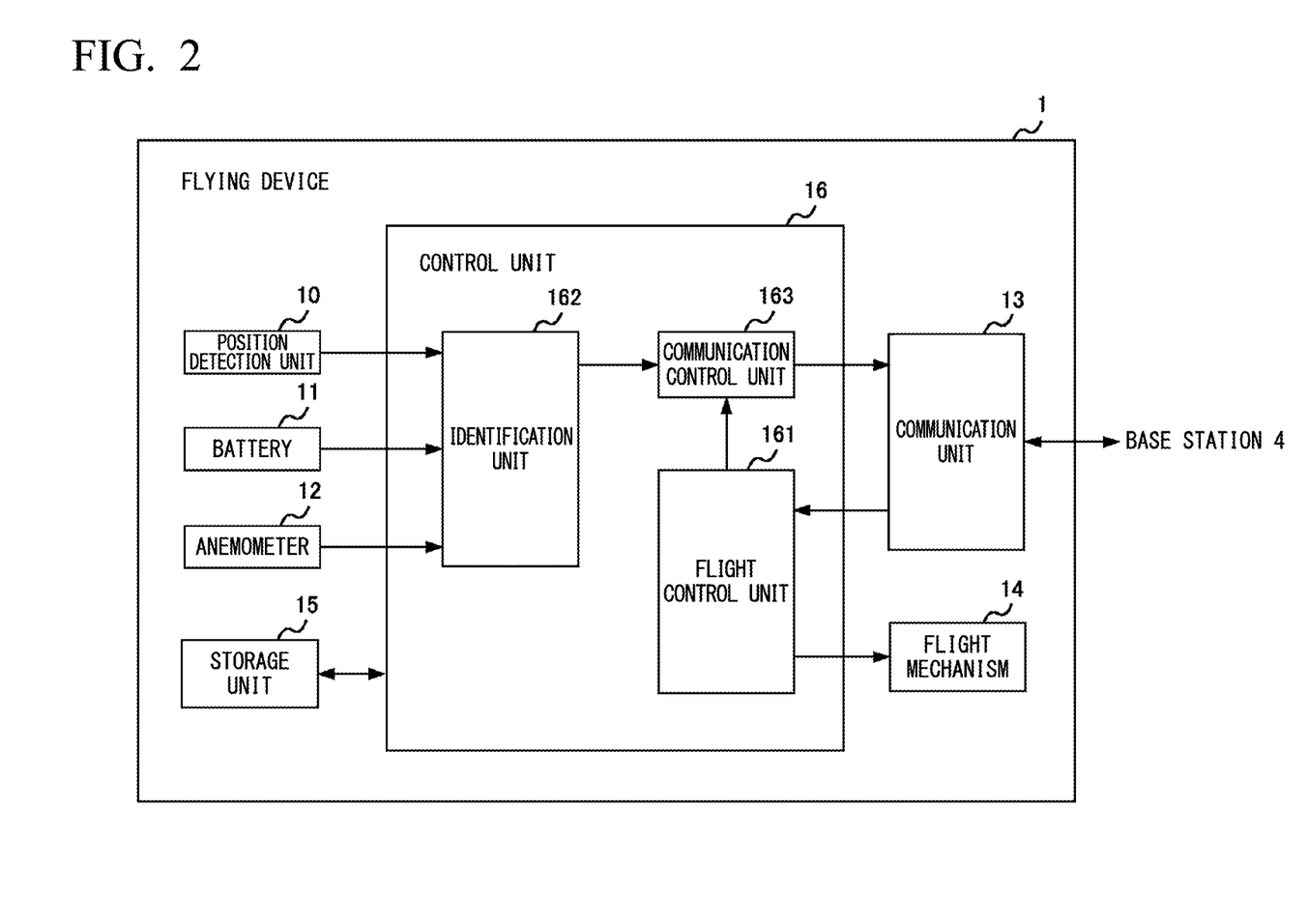
FIG. 2 is a block diagram showing a configuration of a flying device according to a first embodiment.

FIG. 2 is a block diagram showing the configuration of the flying device 1 according to the first embodiment. The flying device 1 includes a position detection unit 10, a battery 11, an anemometer 12, a communication unit 13, a flight mechanism 14, a storage unit 15, and a control unit 16. The control unit 16 includes a flight control unit 161, an identification unit 162, and a communication control unit 163.

The position detection unit 10 detects a position of the flying device 1. For example, the position detection unit 10 receives radio waves transmitted from a Global Positioning System (GPS) satellite and identifies the latitude/longitude of the flying device 1 on the basis of the received radio waves. The position detection unit 10 notifies the identification unit 162 of position information representing the identified latitude/longitude.

The battery 11 supplies electric power for causing the flying device 1 to be driven. The battery 11 is a rechargeable battery, for example, a lithium ion battery. The battery 11 supplies electric power to each unit of the flying device 1. A voltage output by the battery 11 is monitored by the identification unit 162.

The anemometer 12 measures the strength and direction of a surrounding wind. The anemometer 12 notifies the identification unit 162 of information representing the measured strength and direction of the wind. The anemometer 12 may notify the flight control unit 161 of information representing the measured strength and direction of the wind.

The communication unit 13 is a communication interface for transmitting and receiving data to and from the flight management device 2 via the base station 4. The communication unit 13 has a wireless communication controller for accessing a wireless communication circuit of a mobile phone network.

The flight mechanism 14 includes a propeller, a motor for rotating the propeller, a rudder, and the like. The flight mechanism 14 can cause a flight speed and a flight direction to be changed by operating these mechanisms on the basis of control of the flight control unit 161.

The storage unit 15 is a storage medium including a read only memory (ROM), a random access memory (RAM), and the like. The storage unit 15 stores a program to be executed by the control unit 16.

The storage unit 15 is used as a work memory of the control unit 16 and temporarily stores, for example, information representing a history of the voltage of the battery 11 and information about the strength and direction of the wind measured by the anemometer 12.

The control unit 16 is, for example, a central processing unit (CPU). The control unit 16 functions as the flight control unit 161, the identification unit 162, and the communication control unit 163 by executing the program stored in the storage unit 15.

The flight control unit 161 controls a flight direction and a flight speed of the flying device 1 by causing the flight mechanism 14 to be operated. For example, the flight control unit 161 changes the flight direction and the flight speed by controlling the flight mechanism 14 on the basis of the strength and direction of the wind acquired from the anemometer 12.

The identification unit 162 identifies that the flying device 1 is likely to fall. For example, the identification unit 162 identifies that the flying device 1 is likely to fall on the basis of the remaining amount of power of a battery that supplies electric power for causing the flying device 1 to be driven. For example, the identification unit 162 identifies the remaining amount of power of the battery 11 on the basis of an output voltage of the battery 11 with reference to a relationship between an output voltage of the battery 11 and the remaining amount of battery power thereof stored in the storage unit 15. The identification unit 162 measures power consumption at a current point in time and calculates an available flight time period on the basis of the relationship between the remaining amount of power of the battery 11 and the power consumption. The identification unit 162 determines that there is a possibility of falling when the available flight time period is less than a time period required for the flying device 1 to reach an available landing location.

The identification unit 162 may identify that the flying device 1 is likely to fall on the basis of the wind speed and the wind direction. The identification unit 162 refers to information representing the wind speed and the wind direction in which flight is possible stored in the storage unit 15 and identifies that the flying device 1 is likely to fall when a current wind speed and a current wind direction input from the anemometer 12 are not in a range of the wind speed and the wind direction in which flight is possible. When it is identified that the flying device 1 is likely to fall, the identification unit 162 notifies the communication control unit 163 that the flying device 1 is likely to fall. Also, the flight management device 2 may periodically acquire information representing the wind speed and the wind direction from a weather information distribution service to predict a wind speed and a wind direction at a current position of the flying device 1 and the identification unit 162 may acquire information representing the wind speed and the wind direction predicted by the flight management device 2 to identify that the flying device 1 is likely to fall on the basis of the acquired information.

The communication control unit 163 transmits and receives various types of information to and from the flight management device 2 via the communication unit 13. The communication control unit 163 transmits notification information representing that there is a possibility of falling to the flight management device 2 together with position information representing a position of the flying device 1 provided through a notification from the position detection unit 10. The communication control unit 163 may transmit a captured image generated by a camera (not shown) mounted on the flying device 1 to the flight management device 2.

[Configuration of Flight Management Device 2]

Figure 3:
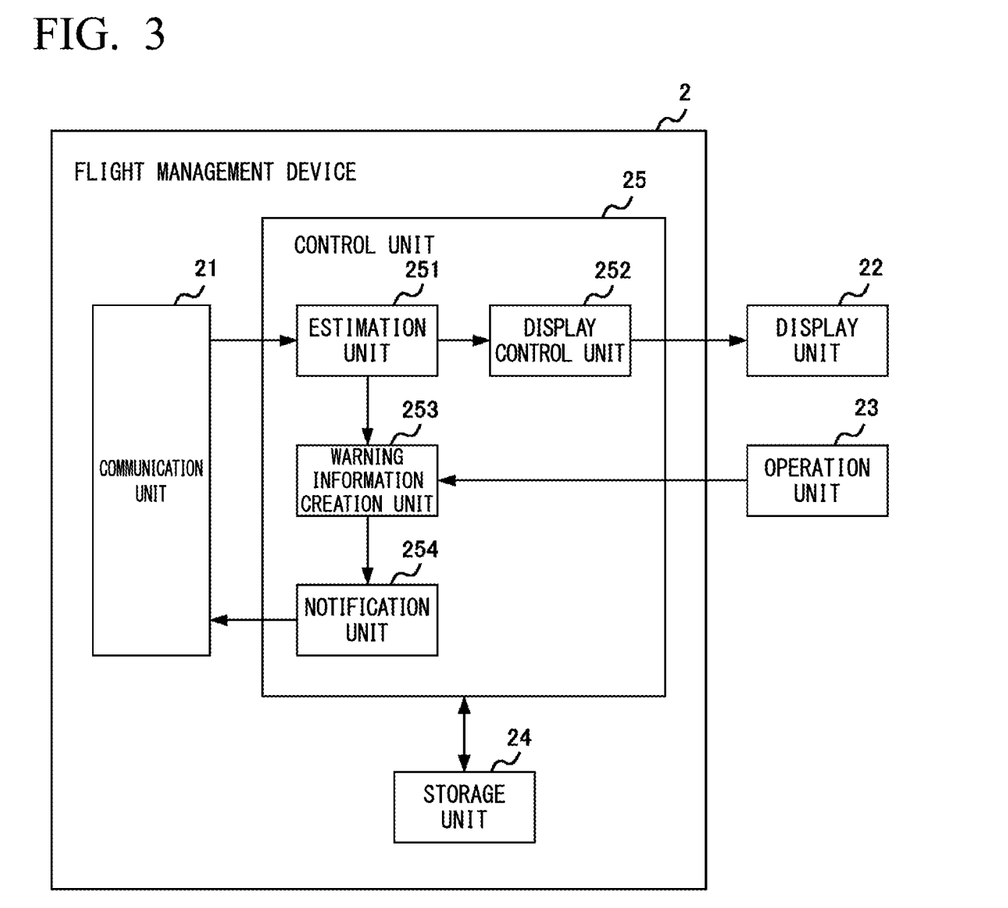
FIG. 3 is a block diagram showing a configuration of the flight management device according to the embodiment.

FIG. 3 is a block diagram showing a configuration of the flight management device 2. The flight management device 2 includes a communication unit 21, a display unit 22, an operation unit 23, a storage unit 24, and a control unit 25. The control unit 25 includes an estimation unit 251, a display control unit 252, a warning information creation unit 253, and a notification unit 254.

The communication unit 21 is a communication interface for communicating with the flying device 1 via the base station 4. The communication unit 21 has, for example, a local area network (LAN) controller for connecting to the Internet.

The display unit 22 is a display that displays various types of information. For example, the display unit 22 displays a captured image received from the flying device 1 or a position where the flying device 1 is in flight on a map.

The operation unit 23 is an operation device that receives an operation from a staff member for a service provider who manages the flying device 1 using the flight management device 2 and is, for example, a keyboard, a mouse, or a touch panel. The operation unit 23 inputs a signal based on operation content to the warning information creation unit 253.

The storage unit 24 is a storage medium including a ROM, a RAM and a hard disk. The storage unit 24 stores a program to be executed by the control unit 25. Also, the storage unit 24 is used as a work memory of the control unit 25, and temporarily stores, for example, the captured image and the position information received from the flight management device 2. Also, the storage unit 24 stores warning information for notifying the vehicle of a case in which the flying device 1 is likely to fall.

The control unit 25 is, for example, a CPU, and functions as the estimation unit 251, the display control unit 252, the warning information creation unit 253, and the notification unit 254 by executing the programs stored in the storage unit 24.

The estimation unit 251 estimates a caution area where the flying device 1 is likely to fall on the basis of the flight speed and the flight direction of the flying device 1 provided through a notification from the flight management device 2 via the communication unit 21. For example, the estimation unit 251 estimates a position where an altitude is assumed to be zero when the flight is continued at a current flight speed as a position where a probability of falling is highest on the basis of a flight position at a point in time when notification information representing that there is a possibility of falling has been received. The estimation unit 251 lowers the probability of falling as the position is away from the position where the probability of falling is highest. The estimation unit 251 may estimate a position where the altitude of the flying device 1 is assumed to be zero on the basis of a decreased speed under an assumption that the speed will gradually decrease from the current flight speed.

The estimation unit 251 may estimate a time period during which the flight can be continued on the basis of the remaining amount of power of the battery received from the flight management device 2 and estimate a reachable position as a position where a probability of falling is highest when the flight is continued for a time period estimated at the current flight speed. The estimation unit 251 may estimate the position where the probability of falling is highest on the basis of an available flight time period, a flight speed, and a flight direction received from the flight management device 2.

The display control unit 252 causes the display unit 22 to display an estimation result of the estimation unit 251. For example, the display control unit 252 may cause the display unit 22 to display a position estimated by the estimation unit 251 as a position where the flying device 1 falls in a state in which the position is superimposed on the map. The display control unit 252 may cause the display unit 22 to display an image of a form which differs according to a level of the probability that the flying device 1 will fall in a state in which the image is superimposed on the map.

A manager of the flying device 1 using the flight management device 2 can ascertain the position where the flying device 1 is likely to fall by visually recognizing the image displayed on the display unit 22.

The warning information creation unit 253 creates warning information whose notification is provided to the vehicle. For example, the warning information creation unit 253 reads the warning information stored in the storage unit 24 at a point in time when a notification representing that there is a possibility of falling has been received from the flight management device 2 and notifies the notification unit 254 of the read warning information.

The warning information creation unit 253 may create warning information including information representing a caution area estimated by the estimation unit 251 or create warning information in which a level of a probability estimated by the estimation unit 251 is associated with a position.

When the communication unit 21 has received the notification information representing that the flying device 1 is likely to fall from the flying device 1, the notification unit 254 transmits warning information to a vehicle which is present at a position corresponding to the position information received from the flying device 1 and is traveling or stopped. The position corresponding to the position information received from the flying device 1 is a position where the flying device 1 in flight is likely to fall around the position. The position of the vehicle that is a target to which the warning information is transmitted may be a position which is estimated by the estimation unit 251 and where a probability that the flying device 1 will fall is higher than a probability preset by the manager. For example, the notification unit 254 is located within the caution area estimated by the estimation unit 251 and transmits warning information to a vehicle that is traveling or stopped.

The notification unit 254 may transmit the warning information via an external device. For example, the notification unit 254 transmits the warning information to the road information provision device 3 used by an authority that manages a road that the flying device 1 is flying over. The road information provision device 3 is, for example, a server that provides various types of information to a vehicle that is traveling or stopped on the road corresponding to position information received from the flying device 1. For example, the road information provision device 3 transmits warning information that can be received by a vehicle that is traveling or stopped in a caution area where the flying device 1 is likely to fall from the road information transmission device 5 such as an FM multiplex broadcasting system or a beacon (radio wave beacon or an optical beacon) transmission device installed on an expressway.

The notification unit 254 may transmit the warning information to the vehicle via the base station 4 of the portable phone network in which radio waves is likely to reach the flying device 1. For example, the notification unit 254 transmits information representing a position of the caution area to a server of a portable phone service provider. The server of the portable phone service provider causes the base station 4, which transmits the radio waves reaching the caution area, to transmit the warning information. The server of the portable phone service provider may designate a portable terminal that stays in the caution area and transmit the warning information thereto.

The notification unit 254 may transmit information representing a caution area and information representing a probability that the flying device 1 will fall in each caution area in association with each other to the road information provision device 3 or an external device such as a server of the portable phone service provider. In this case, the external device may transmit the warning information having different content according to a level of a probability of falling corresponding to the caution area. Thereby, a driver of a vehicle present in an area having a high probability of falling more easily recognizes the danger than a driver of a vehicle present in an area having a low probability of falling.

Also, the notification unit 254 may continuously transmit the warning information not only while the flying device 1 is likely to fall, but also after the flying device 1 falls. Thereby, it is possible to reduce a probability that the vehicle will collide with the flying device 1 that has fallen. The notification unit 254 may designate warning information to be transmitted before the flying device 1 falls and warning information to be transmitted after the flying device 1 falls as different information. Thereby, the vehicle or the driver of the vehicle can take an optimum action in accordance with whether a situation is before the flying device 1 falls or after the flying device 1 falls.

[Processing Sequence in Flight Management System S]

Figure 4:
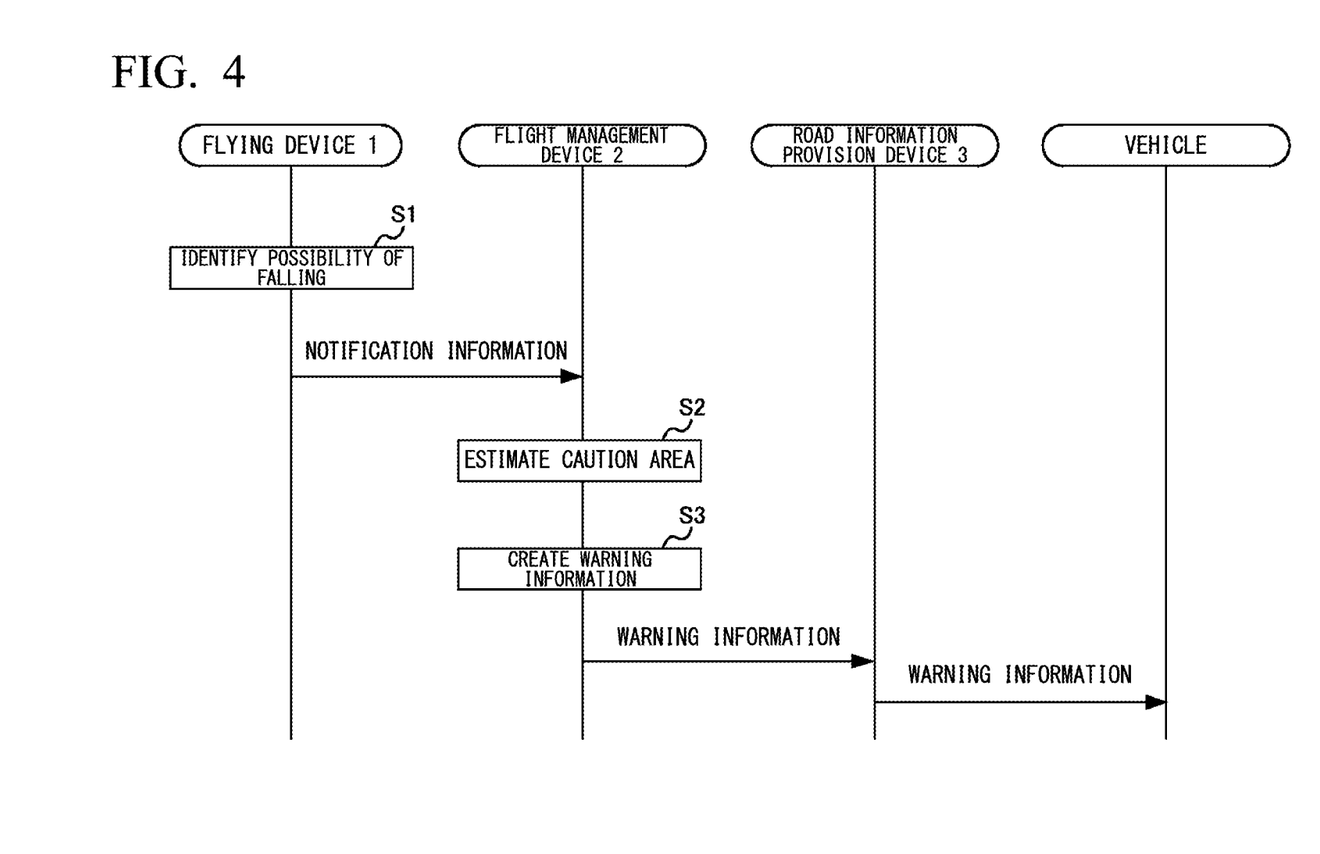
FIG. 4 is a sequence diagram showing a process of the flight management system according to the embodiment shown in FIG. 1.

FIG. 4 is a diagram showing a processing sequence in the flight management system S. The sequence diagram shown in FIG. 4 starts from a point in time when it is identified that the flying device 1 is likely to fall (S1). When it is identified that the flying device 1 is likely to fall, the flying device 1 transmits notification information representing that there is a possibility of falling to the flight management device 2.

When the notification information is received, the estimation unit 251 of the flight management device 2 estimates a caution area where the flying device 1 is likely to fall. Subsequently, the warning information creation unit 253 creates warning information for a vehicle that is traveling or stopped in the caution area (S3) and the notification unit 254 transmits the warning information to the road information provision device 3. The road information provision device 3 transmits the warning information to the vehicle that is traveling or stopped in the caution area.

Modified Example

An example in which the estimation unit 251 of the flight management device 2 estimates the caution area where the flying device 1 is likely to fall on the basis of the flight speed and the flight direction of the flying device 1 has been described above. Instead of this, the identification unit 162 of the flying device 1 may function as an estimation unit to estimate the caution area where the flying device 1 is likely to fall. In this case, the communication control unit 163 transmits notification information including area information representing the caution area to the flight management device 2 via the communication unit 13.

Also, although a case in which the identification unit 162 of the flying device 1 identifies that there is a possibility of falling has been described above, the flight management device 2 may identify that the flying device 1 is likely to fall. For example, the flight management device 2 may acquire information representing the remaining amount of power of the battery from the flying device 1 or information representing a flight state such as the flight speed or the flight altitude and identify that there is a possibility of falling on the basis of the acquired information.

Second Embodiment

Figure 5:
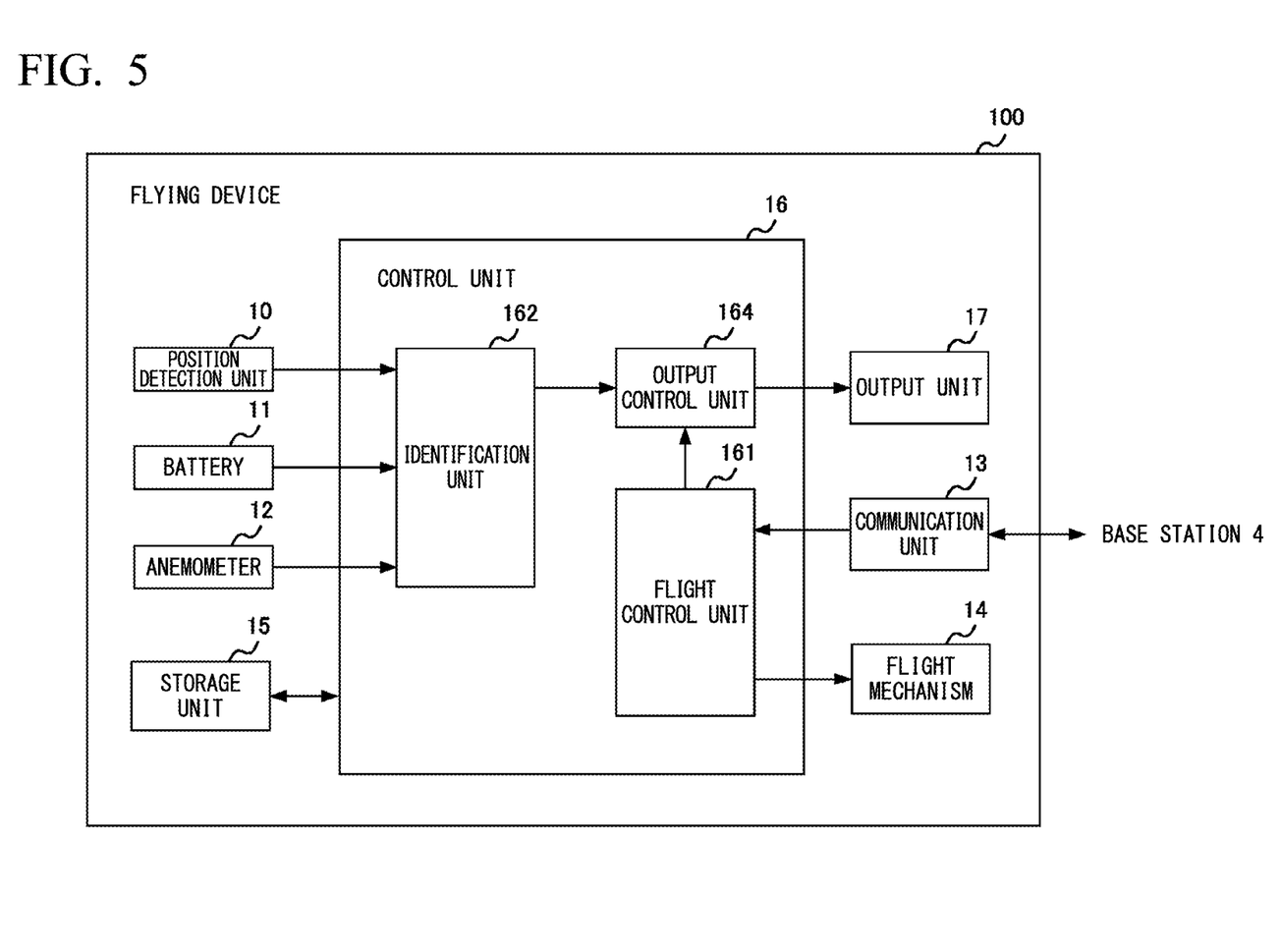
FIG. 5 is a block diagram showing a configuration of a flying device according to a second embodiment.

FIG. 5 is a block diagram showing a configuration of a flying device 100 according to a second embodiment. The flying device 100 is different from the flying device 1 in that the flying device 100 includes an output unit 17 and an output control unit 164. The output unit 17 issues warning information to a driver of a vehicle that is traveling or stopped in a caution area where the flying device 100 is likely to fall. The output unit 17 includes, for example, at least one of a display for displaying warning information, a transmitter for transmitting radio waves including the warning information, a speaker for outputting a sound including the warning information, and a light emitter for emitting light as the warning information. The output unit 17 prompts the driver of the vehicle to exercise caution, for example, by radiating light to the vehicle that is traveling or stopped in the caution area as the warning information.

The output unit 17 may output a warning signal (for example, a wireless signal) having a predetermined frequency as the warning information. The predetermined frequency is a frequency which is predetermined as a frequency for receiving the warning information and at which the vehicle can constantly perform reception. The output unit 17 may output a warning signal having a magnitude according to a level of a probability that the flying device 1 will fall. Thereby, because the vehicle or a portable terminal of the driver of the vehicle can receive a high-level warning signal when the flying device 1 having a high possibility of falling is approaching the vehicle, the vehicle or the driver of the vehicle can recognize that the flying device 1 having a high possibility of falling is approaching the vehicle.

In this manner, when the flying device 100 is likely to fall, the flight management device 2 does not transmit the warning information, but the flying device 100 directly outputs the warning information. Thereby, even if a state of a communication circuit between the flight management device 2 and the road information provision device 3 is poor, it is possible to promptly notify the vehicle that the flying device 100 is likely to fall.

Although the present invention has been described above using the embodiments, the technical scope of the present invention is not limited to the scope described in the above-described embodiments and various modifications and changes are possible within the scope of the subject matter thereof. For example, the specific embodiment of the distribution/integration of the devices is not limited to the above-described embodiment and all or a part thereof can be configured to be functionally or physically distributed/integrated in any unit. Also, a new embodiment produced by any combination of a plurality of embodiments is also included in the embodiment of the present invention. The effect of the new embodiment produced by the combination has the effect of the original embodiment.

REFERENCE SIGNS LIST

1 Flying device
2 Flight management device
3 Road information provision device
4 Base station
5 Road information transmission device
10 Position detection unit
11 Battery
12 Anemometer
13 Communication unit
14 Flight mechanism
15 Storage unit
16 Control unit
17 Output unit
21 Communication unit
22 Display unit
23 Operation unit
24 Storage unit
25 Control unit
100 Flying device
161 Flight control unit
162 Identification unit
163 Communication control unit
164 Output control unit
251 Estimation unit
252 Display control unit
253 Warning information creation unit
254 Notification unit

The invention claimed is:

1. A flight management device for managing a flying device, the flying device including an identification unit configured to identify that the flying device is likely to fall, and a communication unit configured to transmit notification information representing that the flying device is likely to fall, as identified by the identification unit, together with position information representing a position in flight to the flight management device,
   at least one of the flying device and the flight management device comprising an estimation unit configured to estimate a caution area where the flying device is likely to fall based on the position information, a flight speed, and a flight direction of the flying device, and
   the flight management device comprising:
      a notification unit configured to transmit warning information to a vehicle at a position within the caution area estimated by the estimation unit when the notification information has been received from the flying device in flight.

2. The flight management device according to claim 1, wherein the identification unit is configured to identify that the flying device is likely to fall based on a remaining amount of power of a battery that provides electric power for causing the flying device to be driven.

3. The flight management device according to claim 1, wherein the identification unit is configured to identify that the flying device is likely to fall based on a wind speed and a wind direction.

4. The flight management device according to claim 1, wherein the estimation unit is a flight management device estimation unit included in the flight management device.

5. The flight management device according to claim 1, wherein the estimation unit is a flying device estimation unit included in the flying device.

6. The flight management device according to claim 1, wherein the notification unit is configured to transmit the warning information to an authority that manages a road on which the flying device is likely to fall.

7. The flight management device according to claim 1, wherein the notification unit is configured to transmit the warning information to the vehicle via a base station of a portable phone network in which radio waves are likely to reach the flying device.

8. The flight management device according to claim 1, wherein, in response to the flying device falling, the notification unit is configured to continuously transmit the warning information after the flying device falls.

9. The flight management device according to claim 1, wherein the vehicle has an automated traveling function of receiving the warning information from the notification unit and changing a route.

10. A flying device comprising:
    an identification unit configured to identify that the flying device is likely to fall while the flying device is in flight; and
    an output unit configured to output, at a time when the flying device is likely to fall, warning information to a vehicle within an estimated caution area while the flying device is in flight,
    wherein the flying device acquires the estimated caution area indicating where the flying device is likely to fall such that the output unit outputs the warning information to the vehicle located within the caution area.

11. The flying device according to claim 10, wherein the identification unit is configured to identify that the flying device is likely to fall based on a remaining amount of power of a battery that provides electric power for causing the flying device to be driven.

12. The flying device according to claim 10, wherein the identification unit is configured to identify that the flying device is likely to fall based on a wind speed and a wind direction.

13. The flying device according to claim 10, wherein the output unit is further configured to radiate light, as the warning information, to the vehicle located within the caution area.

14. The flying device according to claim 10, wherein the output unit is further configured to output, as the warning information, a signal of a magnitude according to a level of a probability that the flying device will fall.

\* \* \* \* \*